(12) United States Patent
Gauthier et al.

(10) Patent No.: US 10,987,785 B2
(45) Date of Patent: Apr. 27, 2021

(54) ELECTRONIC TORQUE WRENCH WITH TRANSDUCER CHECK FUNCTION

(71) Applicant: Gauthier Biomedical, Inc., Grafton, WI (US)

(72) Inventors: Michael T. Gauthier, Grafton, WI (US); Austin R. S. Braganza, Grafton, WI (US)

(73) Assignee: Gauthier Biomedical, Inc., Grafton, WI (US)

( * ) Notice: Subject to any disclaimer, the term of this patent is extended or adjusted under 35 U.S.C. 154(b) by 354 days.

(21) Appl. No.: 15/677,215

(22) Filed: Aug. 15, 2017

(65) Prior Publication Data

US 2018/0043517 A1 Feb. 15, 2018

Related U.S. Application Data

(60) Provisional application No. 62/375,186, filed on Aug. 15, 2016.

(51) Int. Cl.
| | |
|---|---|
| *B25B 23/142* | (2006.01) |
| *G01L 25/00* | (2006.01) |
| *G01L 5/24* | (2006.01) |

(52) U.S. Cl.
CPC ............ *B25B 23/1425* (2013.01); *G01L 5/24* (2013.01); *G01L 25/003* (2013.01)

(58) Field of Classification Search
CPC ...... B25B 23/1425; G01L 5/24; G01L 25/003
USPC .......................................................... 81/479
See application file for complete search history.

(56) References Cited

U.S. PATENT DOCUMENTS

| | | | |
|---|---|---|---|
| 3,130,578 A | 4/1964 | Ames, Jr. | |
| 3,797,305 A | 3/1974 | Ginns Haskell | |
| 3,979,942 A * | 9/1976 | Grabovac | G01L 25/003 73/1.12 |
| 4,244,434 A | 1/1981 | Wilson | |
| 4,558,601 A | 12/1985 | Stasiek et al. | |
| 4,643,030 A * | 2/1987 | Becker | B25B 23/1425 73/770 |
| 4,864,841 A | 9/1989 | Heyraud | |
| 6,167,788 B1 * | 1/2001 | Schonberger | B25B 23/14 73/862.23 |
| 6,646,448 B2 | 11/2003 | Maher et al. | |
| 7,392,712 B2 | 7/2008 | Hsieh | |
| 7,413,065 B2 | 8/2008 | Gauthier | |
| 7,647,807 B2 | 1/2010 | Hansson | |
| 8,438,957 B2 * | 5/2013 | Wener | B25B 23/1427 73/862.22 |
| 8,714,057 B2 | 5/2014 | Anjanappa et al. | |
| 8,844,381 B2 | 9/2014 | Gharib | |
| 8,887,598 B1 * | 11/2014 | Oakley | B67B 7/0423 81/3.09 |
| 9,358,672 B2 * | 6/2016 | Gauthier | A61B 17/8875 |
| 2008/0127711 A1 * | 6/2008 | Farag | B25B 23/1425 73/1.11 |

(Continued)

*Primary Examiner* — Hadi Shakeri
(74) *Attorney, Agent, or Firm* — Boyle Fredrickson, S.C.

(57) ABSTRACT

A torque wrench is provided that includes a force measuring mechanism that enables the wrench to display the force exerted by the wrench and to perform a check of the calibration of the force measuring mechanism. The mechanism can perform the calibration check and can provide feedback to the user regarding the need, if any, for the calibration of the force sensing mechanism prior to further use of the device.

15 Claims, 13 Drawing Sheets

(56) References Cited

U.S. PATENT DOCUMENTS

2010/0170370 A1* 7/2010 Yokoyama .......... B25B 23/1425
                                                    81/479

* cited by examiner

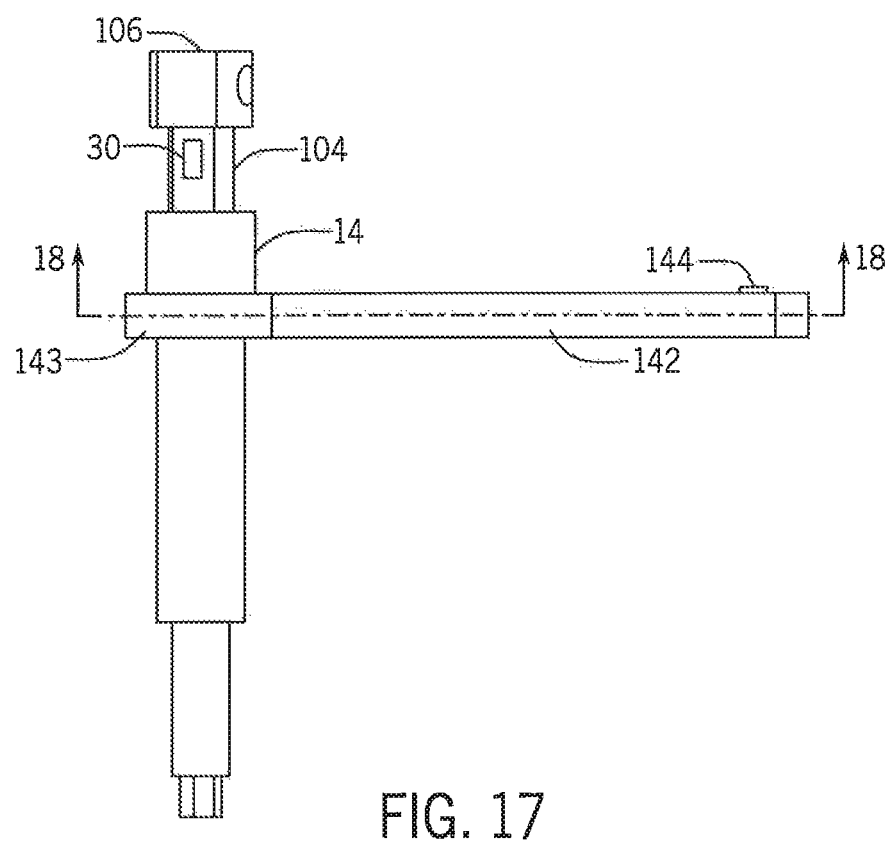
FIG. 17
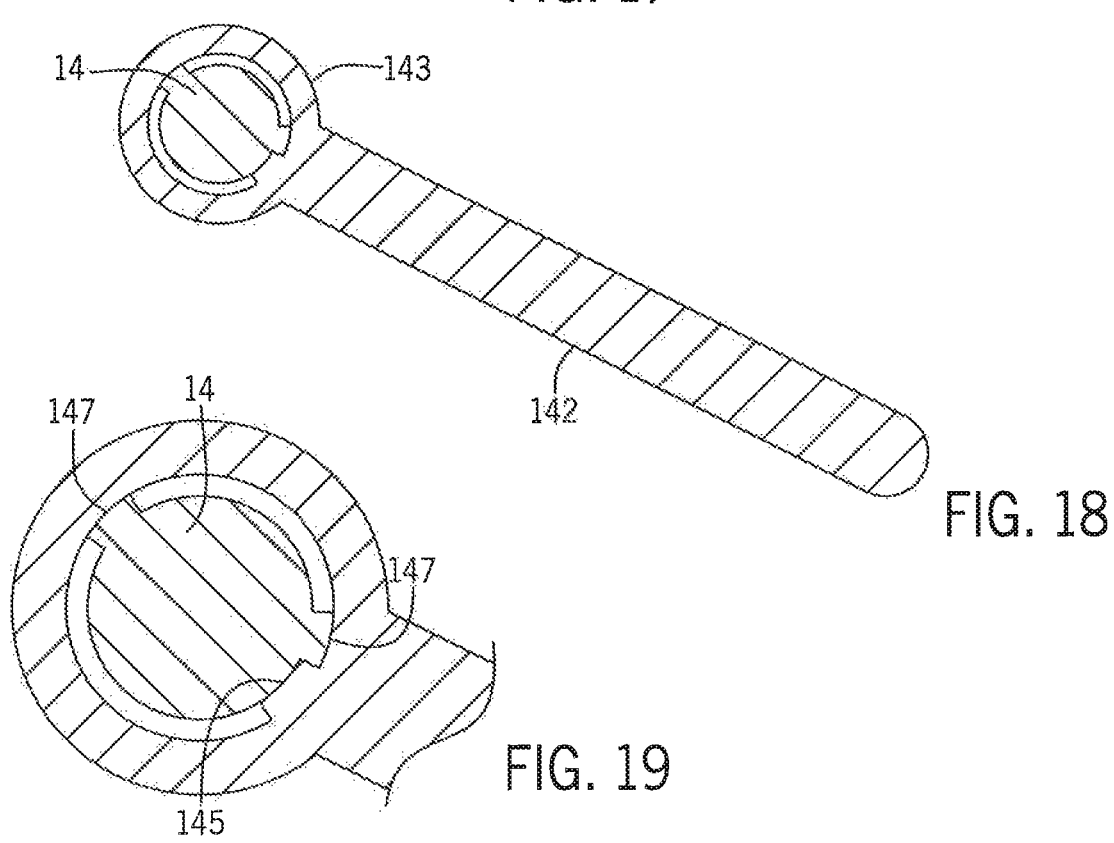
FIG. 18
FIG. 19

ELECTRONIC TORQUE WRENCH WITH TRANSDUCER CHECK FUNCTION

CROSS-REFERENCE TO RELATED APPLICATIONS

The present application claims priority from U.S. Provisional Patent Application Ser. No. 62/375,186, filed on Aug. 15, 2016, the entirety of which is expressly incorporated herein by reference for all purposes.

FIELD OF THE INVENTION

The present invention relates generally to wrenches, and more specifically to an electronic torque wrench including an accuracy checking function in the tool or wrench.

BACKGROUND OF THE INVENTION

Torque wrenches are utilized to drive fasteners into a substrate while allowing the user to control the amount of force exerted on the fastener, such as to avoid damage to the fastener and/or the substrate.

When utilizing electronic types of these devices or tools, the electronics portion of the tool, or wrench in a particular embodiment, operates to measure and/or calculate and display or otherwise illustrate the amount of force or torque that is being applied by the tool to the fastener as it is driven into the substrate. In the particular embodiment where the tool or wrench is being used in a medical procedure, the amount of force utilized to drive the fastener into the substrate is important to monitor closely, as the fastener can damage the substrate, e.g., the bone, into which the fastener is being driven if excessive force is utilized. Additionally, excess torque can cause a fastener to cold fuse or weld to another component of the surgical process, such as a surgical plate, causing damage to the plate, and potentially requiring additional procedures. Conversely, if insufficient torque is applied to the fastener, the fastener can come loose after the procedure, requiring an additional procedure to correct the issue.

However, even when highly accurate electronic force measuring devices, systems, mechanisms or other electronic force measuring units are employed, the electronics unit can be rendered inaccurate for any number of reasons, which require the calibration/re-calibration of the electronics unit. As surgeons or other hospital staff are normally unable to perform calibration procedures on site, they rely on the quality control of the manufacturer with regard to the accuracy of the tool or device.

One significant issue with this situation is that it is often difficult to determine when the electronics unit has become inaccurate. Most often, devices or tools of this type include a schedule according to which the device is required to be calibrated, such as after a certain number of hours of use. Nevertheless, this calibration schedule cannot cover all of the instances where the electronics unit, as the schedule may not be done with sufficient frequency, such that the device may be providing inaccurate force or torque measurements to the user.

Thus, it is desirable to develop a torque wrench including an electronic force measurement unit that can provide a self-check aspect to the force measurement function performed by the electronics unit of the device such that the device can indicate to the user when the measurement unit/device requires calibration prior to being able to be used to provide inaccurate force measurement results.

SUMMARY OF THE INVENTION

Briefly described, according to an exemplary embodiment of the invention a force measuring device or tool, such as a torque wrench, that includes a force measuring mechanism that enables the tool to perform a check of the calibration of the force measuring mechanism. The device can perform the calibration check and can provide feedback to the user regarding the need, if any, for the calibration of the force sensing mechanism prior to further use of the device.

According to an exemplary embodiment of the invention, the device includes a force measuring mechanism and an electronics unit operably connected to the force measuring mechanism. During application of a force using the device for a calibration of the device, the electronics unit can compare the output from the force measuring mechanism with stored acceptable values for the output of the mechanism. If the outputs fall within the acceptable ranges, the electronics unit can indicate that the device is ready for use. If the outputs fall outside of the acceptable ranges, the electronics unit can alter the user of the problem and/or disable the device until the device has been properly serviced.

According to another exemplary embodiment of the invention, a driving tool includes a housing, a shaft operably connected to the housing and engageable with a fastener and an electronics unit within the housing, the electronics unit including a self-checking force measuring mechanism including a force measuring sensor operably connected to the shaft and operable to determine the force applied by the driving tool and provide a calibration check for the force measuring mechanism.

According to another exemplary embodiment of the invention, a method of checking the accuracy of a force measuring mechanism on a driving tool includes the steps of providing a driving tool including a housing, a shaft operably connected to the housing and engageable with a fastener and an electronics unit within the housing, the electronics unit including a self-checking force measuring mechanism including a force measuring sensor operably connected to the shaft and operable to determine the force applied by the driving tool and provide a calibration check for the force measuring mechanism, engaging a fastener with the tool, operating the tool to engage the fastener within a substrate and comparing an output value from the force measuring sensor with a reference value.

Numerous other aspects, features, and advantages of the invention will be made apparent from the following detailed description together with the drawings figures.

BRIEF DESCRIPTION OF THE DRAWINGS

The drawings illustrate the best mode currently contemplated of practicing the present invention.

In the drawings:

FIG. 17 is an isometric view of the shaft and arm of the force measuring mechanism of FIG. 12 is a use configuration;

FIG. 18 is a cross-sectional view along line 18-18 of FIG. 17;

FIG. 19 is a circular sectional view along line 19-19 of FIG. 18;

DETAILED DESCRIPTION OF THE INVENTION

Reference will now be made in detail to various embodiments of the invention, one or more examples of which are illustrated in the accompanying drawings. Each example is provided by way of explanation, not limitation, of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 1:
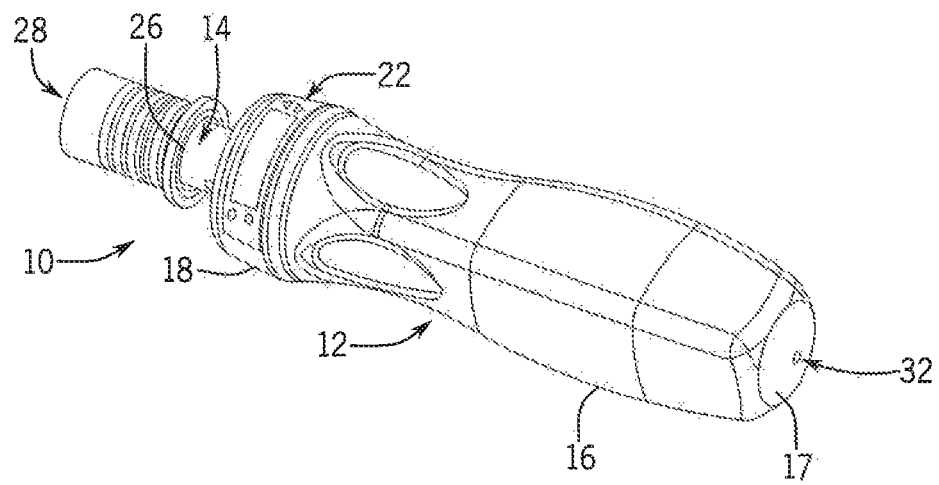
FIG. 1 is an isometric view of an electronic driving tool according to an exemplary embodiment of the invention.
Figure 2:
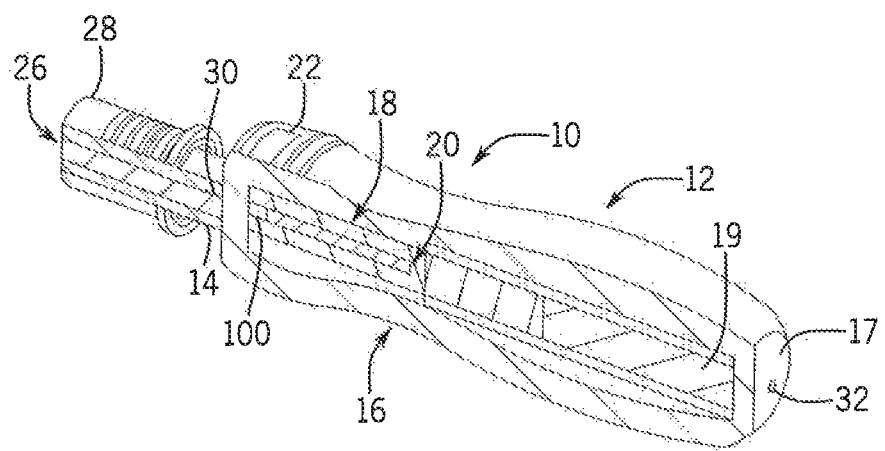
FIG. 2 is a cross-sectional view along line 2-2 of FIG. 1.

Referring now to FIGS. 1 and 2, a driving tool, such as an in-line electronic torque wrench 10 is illustrated in accordance with one exemplary embodiment of the invention, such as that disclosed in U.S. Non-Provisional patent application Ser. No. 14/091,023, entitled Electronic Torque Wrench, the entirety of which is expressly incorporated herein by reference for all purposes. The electronic torque wrench 10 includes a wrench body 12, a ratchet wrench shaft 14, a resilient grip handle 16, a housing 18, a battery assembly 19, and an electronics unit 20 with a user interface or display 22. Preferably, wrench body 12 is of generally a tubular construction, and receives shaft 14 at a first end and a power supply or battery assembly 19 at a second end, secured therein by an end cap 17. Housing 18 is mounted therebetween and carries electronics unit 20.

As shown, a front end 26 of shaft 14 includes an adapter 28 connected to a suitable ratcheting mechanism (not shown) such as that shown in U.S. Pat. No. 7,413,065, incorporated by reference herein in its entirety for all purposes. The adapter 28 is configured to receive variously sized sockets, extensions, etc. The adapter 28 can also be detachably connected to the shaft 14 by any suitable mechanism.

The attachment mechanism for securing the shaft 14 to the body 12 includes a number of sensors 30 configured to sense the torque or strain exerted by the wrench 10 through the shaft 14 onto a fastener (not shown). The sensor 30 can take any of a number of suitable forms, such as a strain gauge, a Hall sensor, and a piezoelectric sensor, among others.

Figure 3:
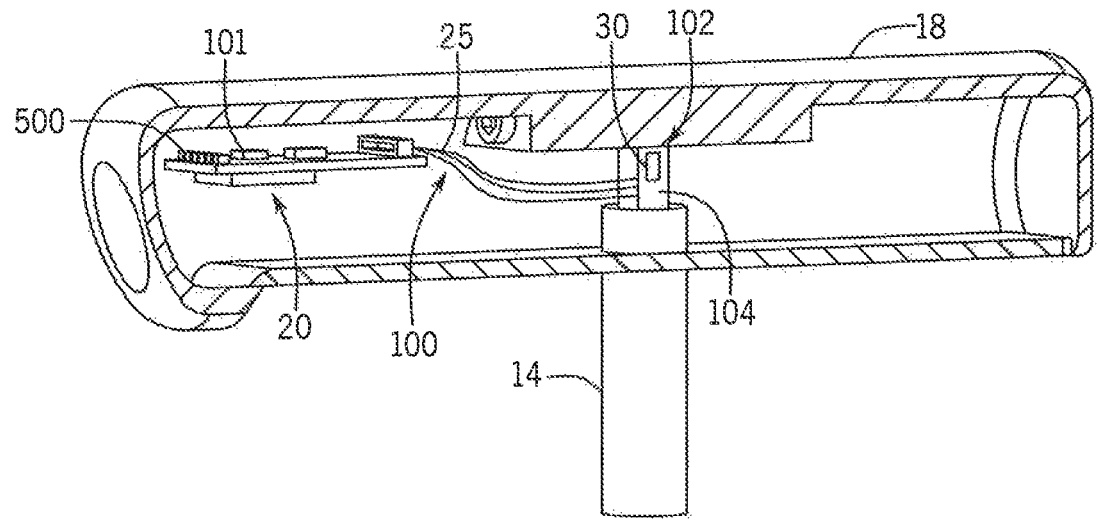
FIG. 3 is a cross-sectional view of a tool handle including a force measurement mechanism according to one exemplary embodiment of the invention.

In the illustrated exemplary embodiment of FIGS. 2 and 3, the sensor(s) 30 forms a portion of a force measuring mechanism 100 that is operably connected to the electronics unit 20, such that the signal generated by the sensor 30 can be transmitted to the unit 20. Once in the unit 20, the unit 20 can utilize the signal for a variety of purposes, such as to calculate a torque value from the signal to provide a real-time indication of the torque applied via the wrench 10 on the display 22.

The operation of the electronics unit 20 and the sensor 30 is controlled by a switch 32 disposed on the body 12, and operably connected between the unit 20 and sensor(s) 30, and the power supply 19 at the opposite end. Thus, the switch 32 enables power to be selectively applied to the unit 20 and sensor(s) 30 as desired. The engagement of the housing 18, the body 12 the handle 16 and the end cap 17 provide an enclosure or barrier 33, which can also be formed separately, for the battery assembly 19, the electronics unit 20 and the sensor(s) 30, as well as the torque measurement system 100, that enables the wrench 10 to be autoclaved for sterilization purposes without damaging the battery assembly 19, the electronics unit 20 or the sensor(s) 30, as well as the display 22.

The torque measurement mechanism 100 disposed within the housing 18 and operatively connected to the shaft 14 and/or the electronics unit 20. The mechanism 100 is capable of determining the force and/or torque applied by the wrench 10 as it drives the fastener (not shown) into the tissue of the patient (not shown).

In one particular exemplary embodiment shown in FIG. 3, the force measuring mechanism 100 includes a microcontroller circuit 101, which can be a part of electronics unit 20, that is connected to a transducer 102. The transducer 102 operates to convert the mechanical force exerted by the device 10 into an electrical signal that can be transmitted to and analyzed by the circuit 101/electronics unit 20. In the illustrated exemplary embodiment of FIG. 3, the transducer 102 includes a number of sensors 30 attached to or otherwise connected to the shaft 14 extending outwardly from the housing 18 of the device 10. The sensors 30 are mounted to a metal rod 104 that is engaged with the shaft 14 within the housing 18, such that rotation of the shaft 14 is directly translated to the rod 104 and the sensors 30. The rod 104 is inserted within a cylinder 106 located opposite the shaft 14, which can rotate in conjunction with the shaft 14 and which is additionally engaged with the housing 18 to maintain alignment of the transducer 102 with regard to the shaft 14 and the housing 18.

Figure 4:
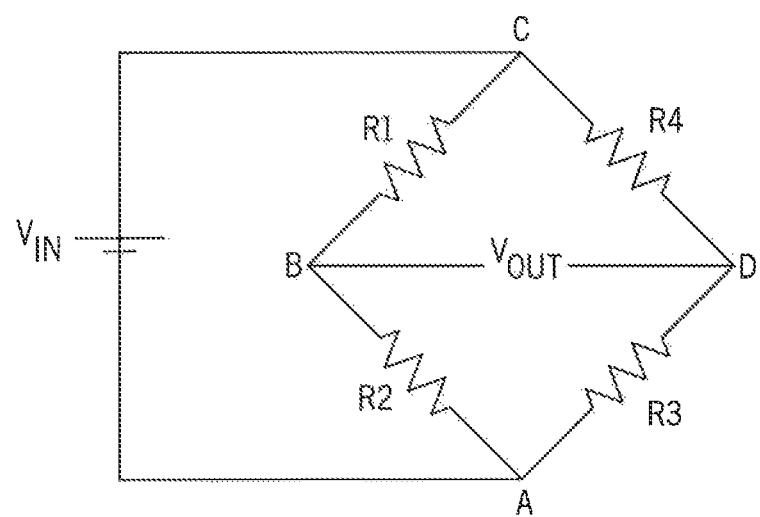
FIG. 4 is a schematic view of a sensor configuration for the force measurement mechanism according to another exemplary embodiment of the invention.

In the illustrated exemplary embodiment, the sensors 30 take the form of strain gauges formed from thin metallic foil (not shown) attached to a thin insulating flexible backing film (not shown). The foil is trimmed into a thin alternating pattern, or zig zag pattern to create precise resistors (not shown) that can flex upon corresponding flexing of the shaft 14 due to rotation of the shaft 14 when the device 10 is in use. The flexing (stretching or compression) of the foil creates changes in the resistance to a current, or excitation signal, directed through the foil form an input to an output which can be measured to determine the strain on the shaft 14. In one embodiment, the strain gauge/sensor 30 is arranged in a Wheatstone bridge pattern (FIG. 4) and mounted to the rod 104 in a direction that enables measurement of the strain via changes in the voltage of the current measured at the input and output of the strain gauge/sensor 30.

Figure 5A:
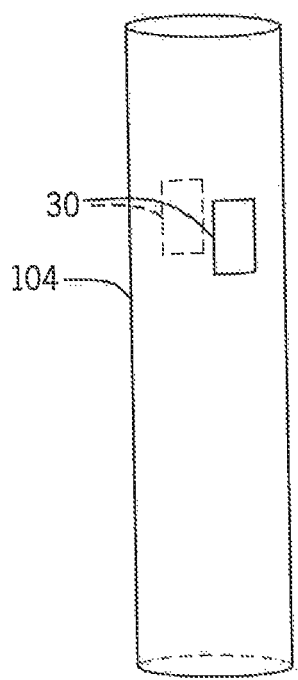
FIGS. 5A-5B are isometric views of alternative sensor configuration for the force measurement mechanism according to another exemplary embodiment of the invention.
Figure 5B:
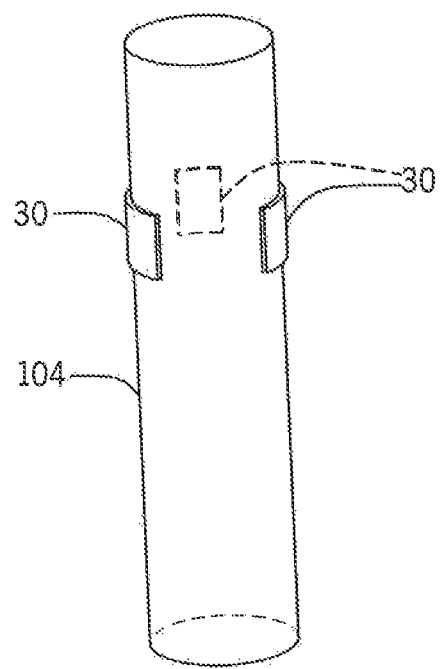

In the exemplary embodiment of FIGS. 5A and 5B, multiple strain gauges/sensors 30 are mounted to the rod 104. With the sensors 30 positioned on the rod 104, the circuit 101/electronics unit 20 can receive two separate measurements of the strain on the shaft 14 from the sensors 30 via wires 25 (FIG. 3) connecting the sensors 30 and the microcontroller circuit 101/electronics unit 20. When the device 10 is not in use, or is initially activated, the microcontroller circuit 101/electronics unit 20 can compare the outputs from the sensors 30 when not under a load, i.e., when the shaft 14 is not being rotated. If the outputs form the sensors 30 are different from one another by more than a specified range or percentage, the circuit 101/electronics unit 20 can determine the device 10 is not calibrated or operating correctly and can provide an error message to the user via the display 22. Conversely, if the outputs are within the specified tolerance range, the circuit 101/electronics unit 20 can indicate this to the user as well. Additionally, this same process can be utilized when the device 10 is in operation to determine if the device 10 is properly calibrated.

In FIG. 5B, this check function provided by the sensors 30 is enhanced by the inclusion of a third sensor 30 on the rod 104, and spaced equidistant from the remaining sensors 30. With the third sensor 30, the microcontroller circuit 101/electronics unit 20 can compare the outputs of each of the three sensors 30 to one another, whether the device 10 is or is not in operation. If two of the sensors 30 are providing similar enough outputs, there is an error in the third sensor 30 and the circuit 101/electronics unit 20 can act accordingly. Additionally, the circuit 101/electronics unit 20 can continue to enable operation of the device 10 in this situation by, omitting the output from the malfunctioning sensor 30 in the determination of the force being applied via the device 10, optionally while providing a warning to the user concerning the condition of the malfunctioning sensor 30.

Figure 6:
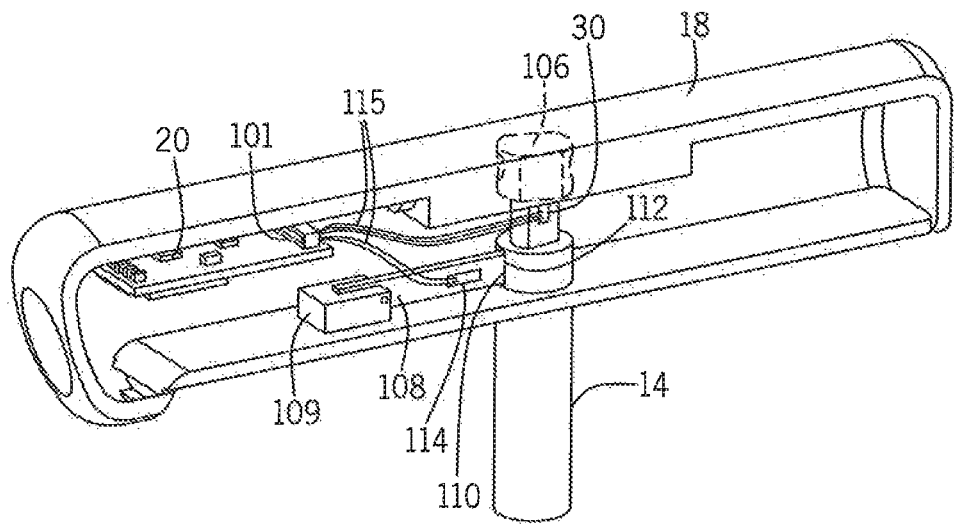
FIG. 6 is an isometric view of a force measurement mechanism according to still another exemplary embodiment of the invention.
Figure 7:
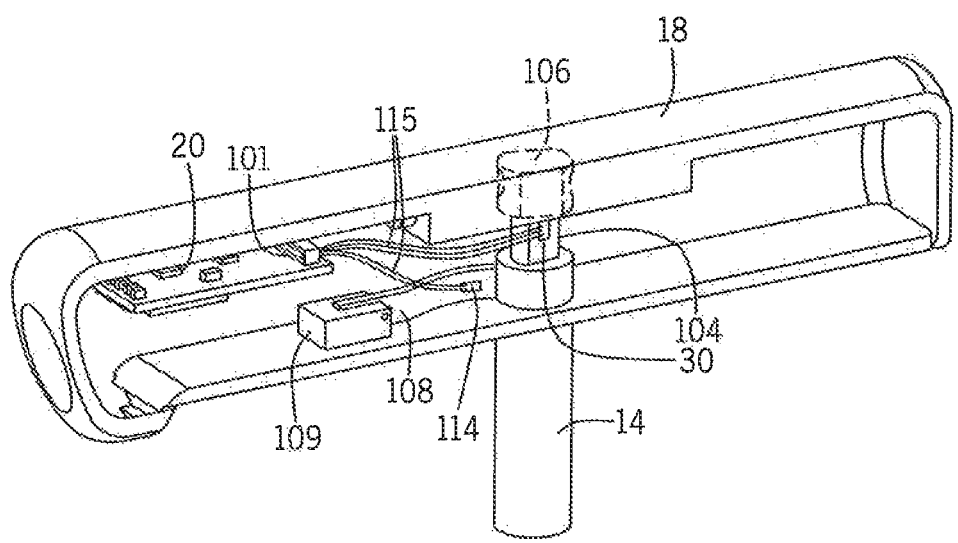
FIG. 7 is an isometric view of the force measurement mechanism of FIG. 6 in a force measuring condition according to a further exemplary embodiment of the invention.

Looking now at FIG. 6, in another exemplary embodiment of the invention, in the force sensing mechanism 100 the transducer 102 includes a metal bar 108 positioned within and fixed at one end to a stop 109 on the housing 18 and engaged with the shaft 14 at the opposite end, such as by inserting one end 110 of the bar 108 located opposite the housing 18 within a complementary slot 112 formed in the shaft 14. The bar 108 includes one or more sensor/strain gauges 114 disposed thereon and operably connected to the microcontroller 101/electronics unit 20 in conjunction with the one or two sensors 30 disposed on the rod 104. As illustrated in FIG. 7, when the shaft 14 is rotated, the shaft 14 also applies a bending force to the bar 108 corresponding to the force being exerted by the wrench 10. The sensors/strain gauges 114 disposed on the bar 108 are operably connected to the microcontroller 101/electronics unit 20, such as by wires 115, and can detect the stress applied to the bar 108 in conjunction with the sensors 30 on the rod 104. In one exemplary embodiment, the gauge 114 can be formed in any suitable manner, such as by using a half or full Wheatstone bridge (FIG. 4) or multiple bridges of either configuration, among other suitable gauge structures. With the sensors 114, the stress on the bar 108 can be determined whether the shaft 14 is rotated in the clockwise or counterclockwise direction, and particularly where multiple sensors/gauges 30,114 are utilized, such that the sensors/gauges 30,114 can be employed as a self-check on each other during use of the mechanism 100 as described previously.

Figure 8:
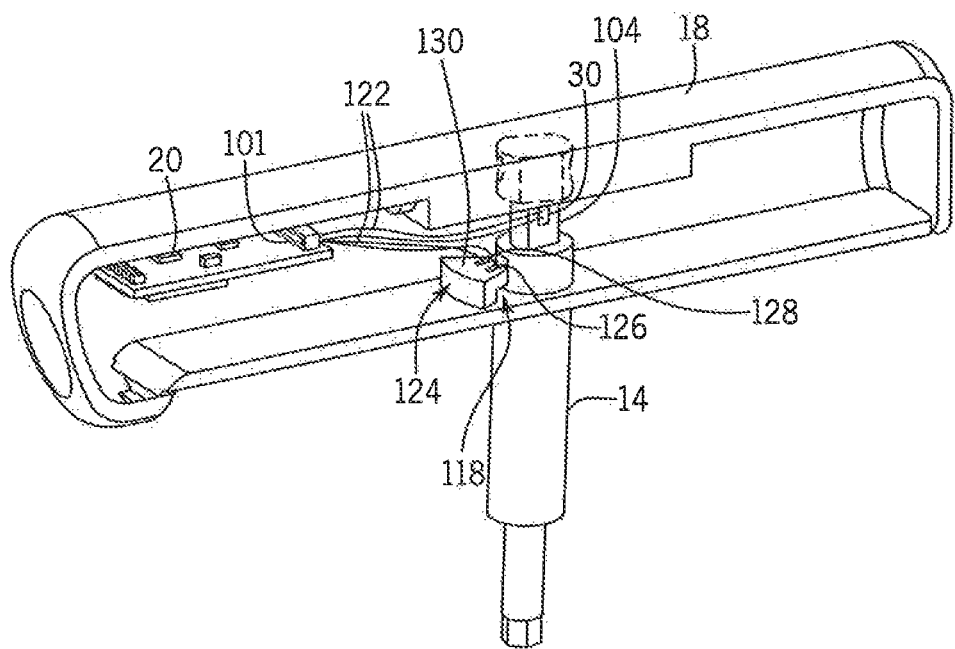
FIG. 8 is an isometric view of a force measurement mechanism according to still a further exemplary embodiment of the invention.

In another exemplary embodiment, as shown in FIG. 8, the force sensing mechanism 100 includes a suitable sensor 118, such as a Hall sensor 120, mounted to the shaft 14 and operably connected to the microcontroller circuit 101/electronics unit 20, such as by wires 122. The sensor 118 is positioned adjacent a magnet 124 disposed in the housing 18 which includes a number of spaced teeth 126-130 thereon. The teeth 126-130 can be spaced from one another by gaps 133 in the material forming the teeth 126-130 or by a mass (not shown) of material different than that forming the teeth 126-130. The teeth 126-130 correspond to different rotational angles of the shaft 14 relative to the housing 18, where the angles correspond to a specified value or amount of torque being applied by or to the shaft 14, with the factory-programmed torque values being stored in a suitable electronic storage medium (not shown) that is operably connected to and accessible by the microcontroller circuit 101/electronics unit 20. The magnet 124 remains stationary on the housing 18 when the device 10 is rotated, but the shaft 14 and sensor 118 thereon rotate relative to the magnet 124. The sensor 118 positioned on the cylinder 106 is consequently positioned in front of different teeth 126-130 depending on the degree of rotation of the cylinder 106, as produced by the force applied via the wrench/device 10. As the sensor 118 moves past the teeth 126-130, the sensor 118 sends signals to the microcontroller circuit 101/electronics unit 20 corresponding to the particular tooth 126,128,130 being sensed by the sensor 118, and thus the amount of force being exerted on the device/tool 10. In conjunction with signals from the sensors 30 on the rod 104, the microcontroller circuit 101/electronics unit 20 can compare the signals or outputs from the Hail sensor 120 with the data in the storage medium to see if the output matched the factory-programmed values. If so, the device 10 is allowed to be utilized and the proper calibration of the device 10 is indicated to the user. If not, an error message is displayed and/or the device 10 is rendered inoperable.

Figure 9:
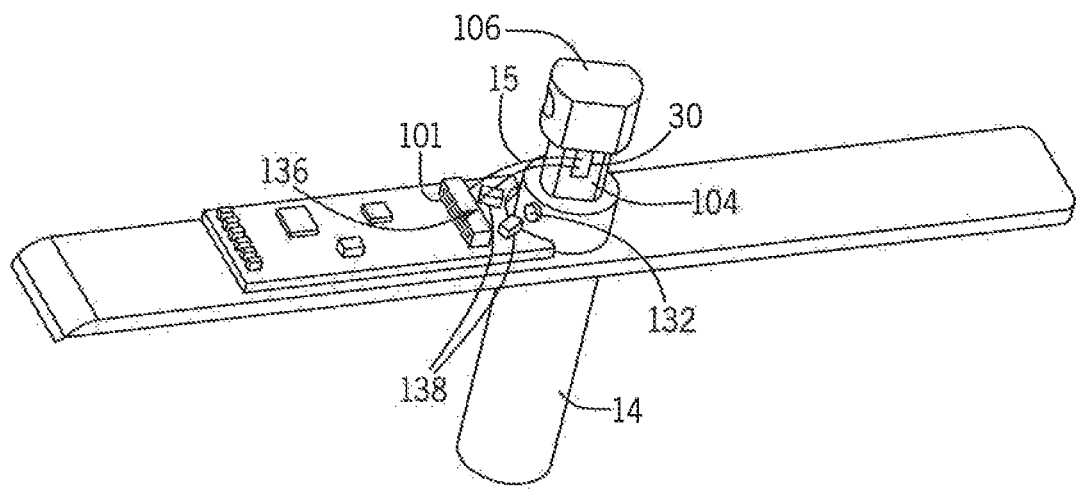
FIG. 9 is an isometric view of a force measurement mechanism according to still another exemplary embodiment of the invention.
Figure 10:
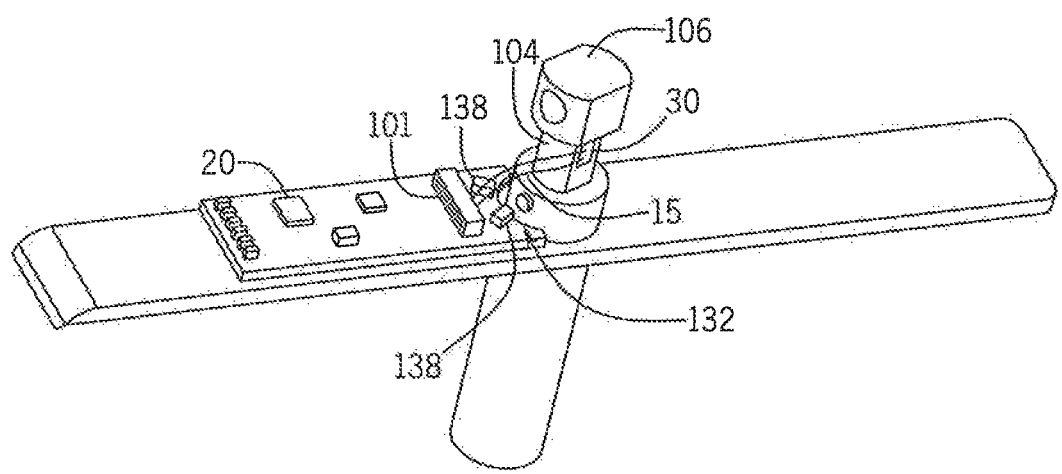
FIG. 10 is an isometric view of the force measurement mechanism of FIG. 9 in a separate force measuring condition according to still another exemplary embodiment of the invention.
Figure 11:
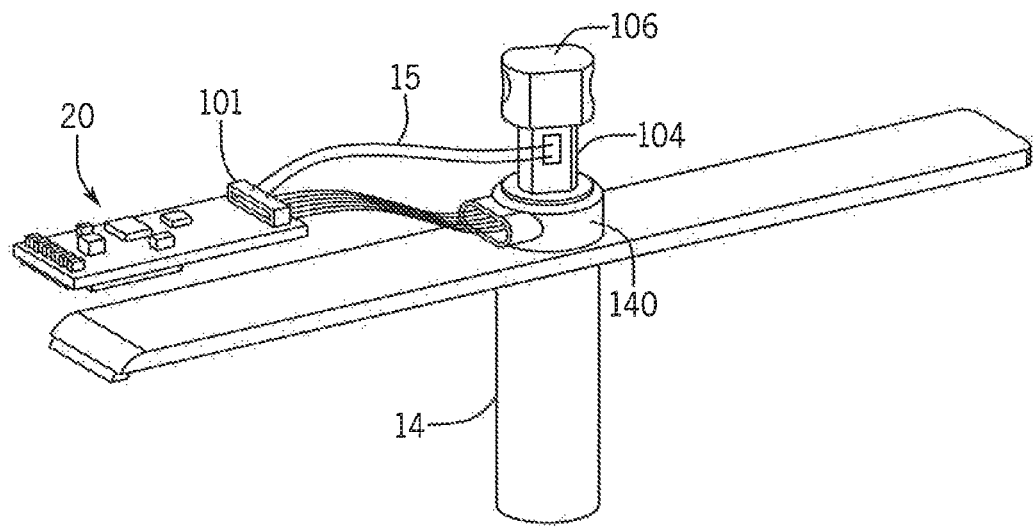
FIG. 11 is an isometric view of a force measurement mechanism according to still a further exemplary embodiment of the invention
Figure 12:
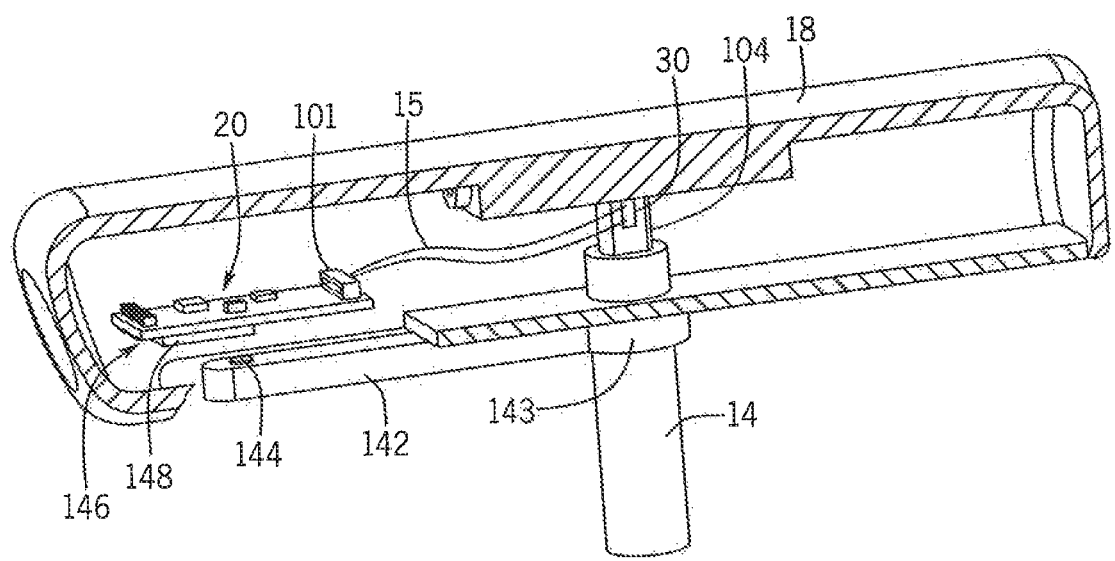
FIG. 12 is an isometric view of a force measurement mechanism according to still another exemplary embodiment of the invention.

In still another exemplary embodiment shown in FIGS. 9 and 10, the force sensing mechanism 100 includes a magnet 132 positioned on the shaft, which can be embedded in the shaft 14 or can extend outwardly from the shaft 14 to form a magneto-resistive angle sensor. A number of switches 136, such as reed switches 138, are mounted to the housing 18 for the mechanism 100 adjacent the shaft 14. As the shaft 14 is rotated, the magnet 132 is moved into and out of alignment with the various switches 136, which correspond to the force exerted by the tool 10, with the corresponding force/torque values stored in the electronic storage medium. In the embodiments of FIGS. 9 and 10, the shaft 14 can rotate in the clockwise and counterclockwise directions to align the magnet 132 with one of the switches 136, thereby providing force/torque measurements in either rotational direction, in conjunction with the outputs from the sensors 30 on the rod 104. Looking now at FIG. 11, in another exemplary embodiment of the invention, the magnet 132 and reed switches 136 can be replaced by a magneto-resistive rotary sensor 140 disposed around the shaft 14 within the housing 18.

In still a further exemplary embodiment shown in FIGS. 12-19, the shaft 14 includes a kick stand/swing arm 142 that is pivotably and rotatably connected to the shaft 14. The arm 142 is formed with a collar 143 at one end that is rotatably disposed about the shaft 14 and a stop 145 located on and extending radially inwardly from the collar 143. The stop 145 can engage one of a pair of tabs 147 located on the shaft 14 that function to limit the rotation of the arm 142 between a storage position and a use or test position. The arm 142 also includes a magnet 144 that is positioned opposite the collar 143 adjacent and in alignment with a sensor 146, such as a reed switch 148, on the housing 18, such as on the electronics unit 20, when the arm 142 is in the storage position in alignment with the housing 18.

Figure 13:
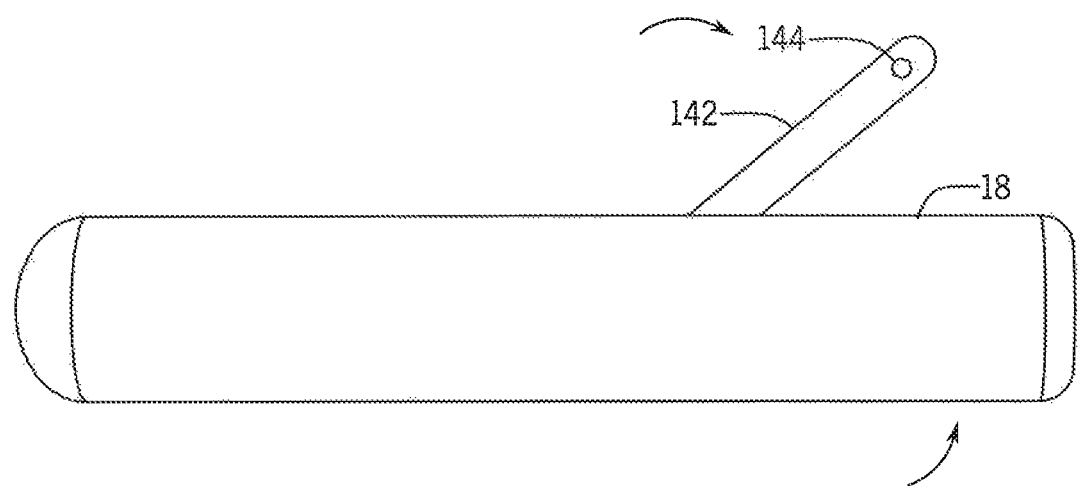
FIG. 13 is a top plan view of the force measurement mechanism of FIG. 12 in a use configuration.
Figure 14:
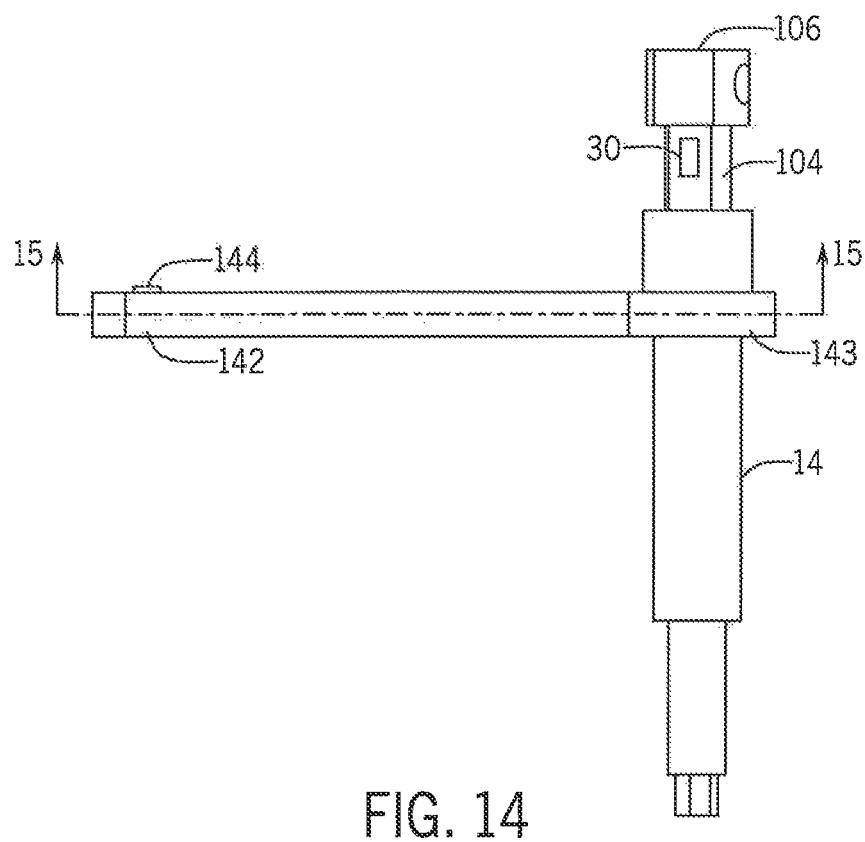
FIG. 14 is an isometric view of the shaft and atm of the force measuring mechanism of FIG. 12 is a storage configuration.
Figure 15:
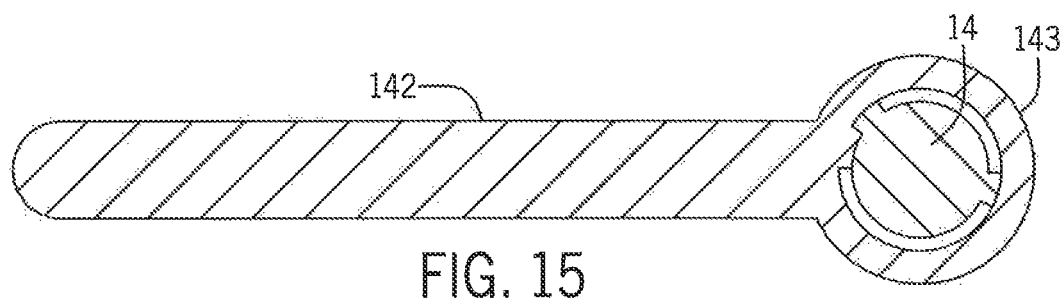
FIG. 15 is a cross-sectional view along line 15-15 of FIG. 14.
Figure 16:
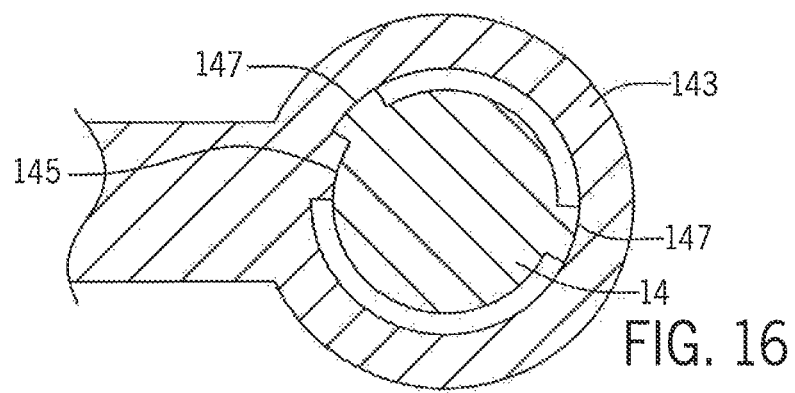
FIG. 16 is a circular sectional view along line 16-16 of FIG. 15.

When the arm 142 is rotated away from the storage position to engage the stop 145 with the other tab 147 on the shaft 14, as shown in FIGS. 17-19, the magnet 144 is displaced from the sensor 146. This activates the self-check function of the device 10. To perform the self-check, the arm 142 is grasped along with the housing 18 and the two are squeezed towards one another as illustrated in FIG. 13. The movement of the arm 142 causes the shaft 14 to rotate as a result of the engagement of the stop 145 with the tab 147, thus creating a torque on the shaft 14 that can be measured by the sensors 30 present in any of the above-described embodiments to determine if the device 10 is properly calibrated or not. Further, in one exemplary embodiment, the arm 142 can be formed such that the stop 145 on the collar 143 positions the arm 142 in the test position at a deflection angle having a known force or torque value, such as 30 in lbs. Thus, when the arm 142 is squeezed towards the housing 18, the micro-controller circuit 101/electronics unit 20 can compare the sensed force or torque value to the known value stored in the electronic storage medium.

In one exemplary embodiment, in order to compare the outputs of the strain gauges/sensors 30 to one another and know whether they are functioning within a predetermined/defined tolerance, such a ±5% tolerance, the device 10 needs to know the voltage and torque output from the device 10 which can then be compared to the known values stored in the electronics unit 20 when the device 10 was initially calibrated.

When the kick stand/arm 142 is folded out, the switch 146 is opened and the device goes into SELF CHECK MODE. The user is then instructed to rotate the kick stand 142 about 300° degrees around the shaft 14 where the mechanical stop 145 will engage the proper tab 147. Upon contacting the tab 147, the user will apply at least 30 in/lbs by squeezing the kick stand 142 and the housing 18 together. This causes the gauges 30 to each provide a voltage output to the electronics unit 20/microcontroller 101 of the device 10. Upon receiving these outputs, the programming of the electronics unit 20/microcontroller 101:

Compares the output values to determine that each strain gage output is at above the factory output/voltage level corresponding to 30 in/lbs, (if not it displays the message "self check incomplete")

If a minimum force of 30 in/lbs is applied, the user is provided an indication that the check is complete and then releases the kick stand 142 and moves it to the closed position within the housing 18, thereby closing the reed switch 146, which the microcontroller 101/electronics unit 20 then assumes provides a value of a torque output at zero, upon the closing of the switch 146.

The microcontroller 101/electronics unit 20 can now compare each strain gauge output voltage and compare it to the factory recorded outputs for zero in/lbs and if one or both are out of tolerance can display a message, such as:

If one gauge/sensor 30 is out or tolerance, "RETURN TO FACTORY FOR SERVICE AFTER THIS SURGICAL PROCEDURE" while still displaying torque values.

If more than one gauge/sensor 30 is out of tolerance, "SELF CHECK FAIL" and does not display torque values.

Figure 20:
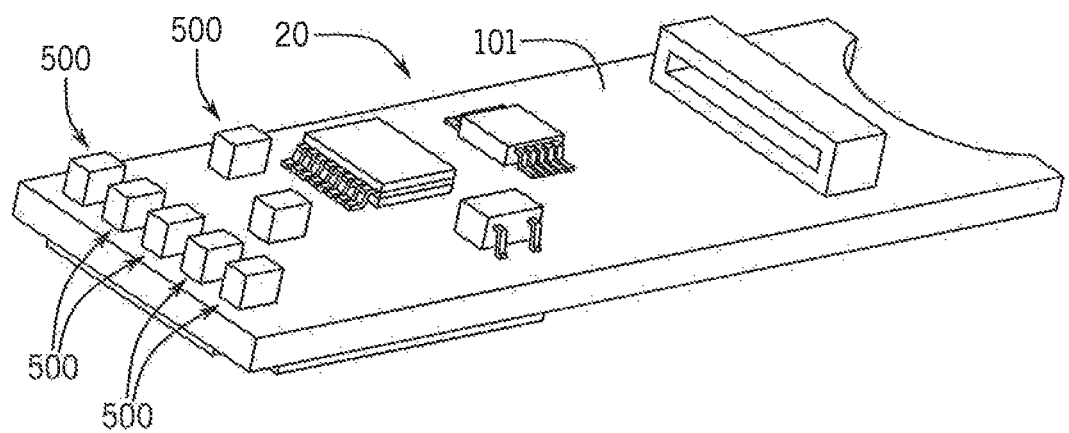
FIG. 20 is an isometric view of a microcontroller circuit/electronics unit according to one exemplary embodiment of the invention.
Figure 21:
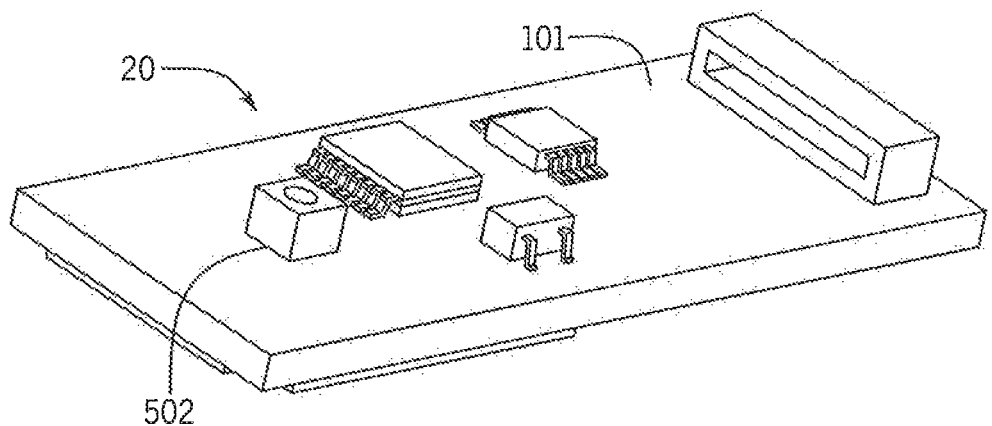
FIG. 21 is an isometric view of a microcontroller circuit/electronics unit according to another exemplary embodiment of the invention.

Alternatively to any of the prior embodiments where the device 10 presents a display of the functionality of the device 10 on a display 22, as shown in FIGS. 20-21, the indication provided by the device 10 can be in the form of one or more LEDs 500 operably connected to the microcontroller circuit 101/electronics unit 20. The microcontroller circuit 101/electronics unit 20 can illuminate one or more of the LEDs 500 in a manner that indicated to the user the current operational state of the device 10. The LEDs 500 can be connected to the microcontroller circuit 101/electronics unit 20 in an array 502 (FIG. 20), with a single LED 500 illuminated to indicate a particular operating condition for the device 10, or can be a multi-color RGB LED 502 (FIG. 21) that can be operated to display a number of different colors, with each color indicative of the current operational condition of the device 10.

Figure 22:
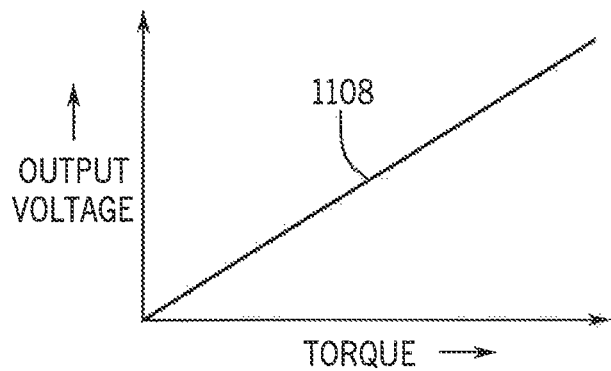
FIG. 22 is a graph of the voltage output from the transducer versus torque applied by the tool.
Figure 23:
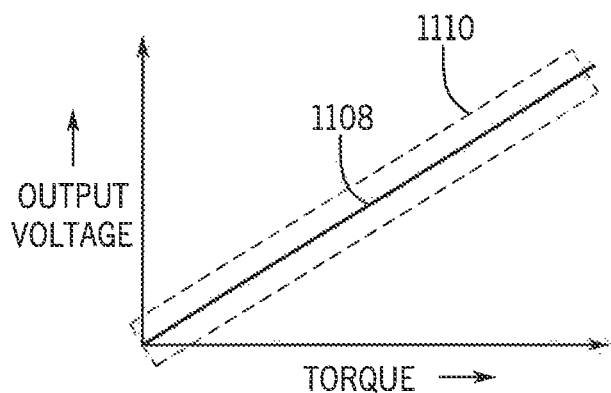
FIG. 23 is a graph of the voltage output from the transducer versus torque applied by the tool within a predetermined tolerance band.

In order to check the outputs of the sensors/gauges 30 for any of these three exemplary embodiments, the electronics unit 20/microcontroller 10 will check the transducer 102 of the mechanism 100 by initially checking an offset of the output voltage from the transducer 102 at a zero (0) torque level to determine what the offset value is, as graphically illustrated in FIG. 22. Subsequently, the user is prompted to apply a certain minimum torque to the mechanism 100 using the device 10 in order to determine the output from the transducer 102 as the torque is applied by the device 10, as illustrated by the line/curve 1108 in FIG. 22. After this torque has been applied by the user, the device circuit/electronics unit 20 will check to make sure the transducer output voltage returns to zero with the same offset value as was initially determined. As shown in FIG. 23, the electronics unit 20 of the device 10 will also check to make sure that the slope of the transducer voltage output 1108 is within the tolerance band 1110 of acceptable torque values, which in an exemplary embodiment of the invention can be defined by a range of +/−5%, or +/−1.% above and below an optimal output curve or line for the determined transducer output.

In one exemplary embodiment of the method of use of the mechanism 100, when the device 10 is initially activated or powered on, the device 10 will display the message "CONDUCT FORCE GAUGE CHECK" on display 22 or a similar message using LEDs 500. Subsequently, the display 22 indicates a message prompt to "CONNECT DEVICE TO TESTER AND TWIST CLOCKWISE UNTIL TESTER CLICKS OVER". This indicates that the device 10, and more particularly the shaft 14 and/or cylinder 106 of the mechanism 100 should be engaged with the tester (not shown) mechanism 100, and twisted to apply torque to the mechanism 100 until the 'clutch' in the device 10 slips at 20-80% of full scale. At this point, the microcontroller/electronics unit 20 checks the outputs from the device 10 and the transducer 102 as shown in FIGS. 22 and 23, and determines whether the transducer 102 is functioning within tolerance. If the transducer 102 is within tolerance then the message "PASS" is illustrated on the display 22 and the torque values applied via the device 10 are subsequently displayed. However, if the transducer 102 is not within tolerance, then the message "FAIL" is illustrated on the display 22 and the device 10 shuts down.

In making this tolerance determination, to know if the transducer 102 is working properly any offset for the transducer output at a zero (0) torque or force output is first noted, as discussed previously, and if the gauge offset is automatically balanced, the electronic unit 20 will note that it is at zero, or automatically set the offset at (0). Then it is necessary to apply a force to the transducer 102 in the intended orientation, which can be clockwise torque or counter-clockwise torque depending upon the particular configuration of the device 10. The force applied should be at least 20% of full scale, and preferably 80-100% full scale. As the torque is applied using the device 10, the electronics unit 20 will determine the curve/slope of the output voltage 108, which optimally should increase in a linear manner, and upon removal of the force, the output 108 should return to zero instantly, as shown in FIG. 22.

As the transducer 102 does not need to function perfectly to be operational, but must be operable within certain tolerances, these tolerances can be input into a suitable memory component (not shown) of the electronics unit 20 for comparison with the output voltage values from the transducer 102. For example, the electronics unit 20 can be programmed with a tolerance 110 of +/−1% for the output voltage from optimal values for the transducer 102, as shown in FIG. 23.

Figure 24:
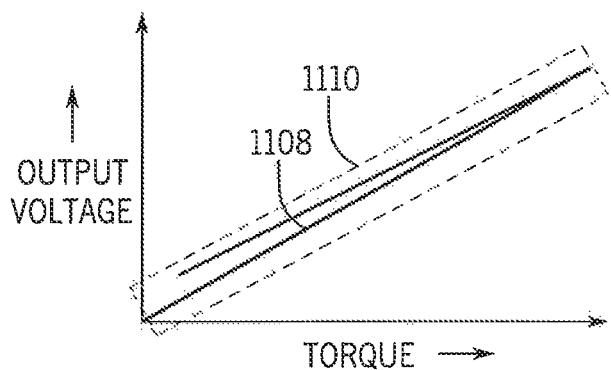
FIG. 24 is a graph of one error in the voltage output from the transducer versus torque applied by the tool compared to a predetermined tolerance band.
Figure 25:
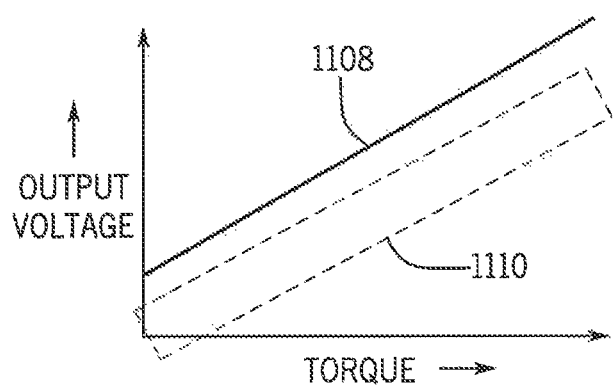
FIG. 25 is a graph of another error in the voltage output from the transducer versus torque applied by the tool compared to a predetermined tolerance band.

Thus, the transducer 102 can be determined to be not working properly by the electronics unit 20 if one or more of the following is observed:

Offset at zero is not the same after each test/trial (FIG. 24)
Output does not immediately (within less than a second) return to zero when the applied force is removed. (FIG. 24)
Output slope is not the same as when tested at factory/output slope is linear but outside of tolerance (FIG. 25)
Output slope is not linear.

Figure 26:
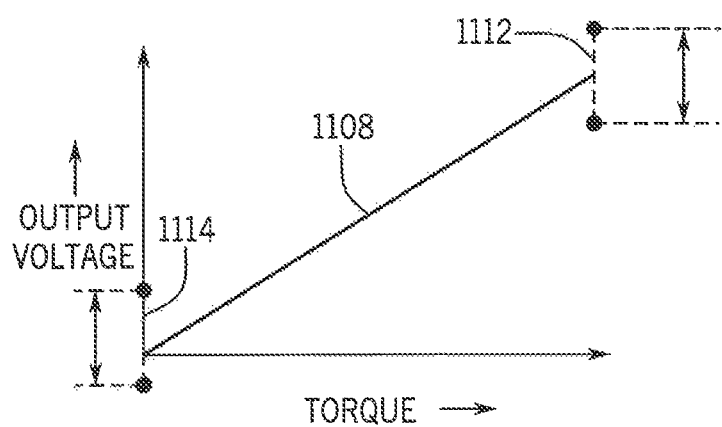
FIG. 26 is a graph of one error in the voltage output from the transducer versus torque applied by the tool where two points of know applied torque are compared to a predetermined tolerance bands for each point.

In addition, as an alternative manner of performing this check function, in the exemplary embodiment graphically illustrated in FIG. 26, at least two (2) points 1112,1114 along the output slope 108 can be checked or compared along a pre-programmed tolerance curve using comparators or comparator functions (not shown) present in the electronics unit 20/microcontroller. In one exemplary embodiment, at a first point 1114 corresponding to no force being applied to the device 10, which should have a value of zero for the output voltage 1108 from the transducer 102, the comparator can be configured to look for and accept a certain 'range' of transducer outputs at this point with a tolerance or range 1110 of +/−1% of the optimal and/or factory setting value (FIG. 26). For a certain torque applied by the device 10, which can optionally be set by the mechanical torque check feature of the device 10, the comparator looks for a similar 'range' 1110 of transducer outputs, for 'x' seconds. Once the transducer output reaches a certain value—the check feature activates, indicating that the minimum torque has been met, and that value is set as the second point 1112.

In making the determination on the operation of the transducer 102, if the transducer 102 does not reach the certain minimum output value determined by range 110, this will be a FAIL. Further, if the transducer 102 does not reach the certain minimum output value within a certain time limit, it will assume a FAIL.

According to yet another exemplary embodiment, the device 10 can be configured with two sensors 30 in the form of torsional strain gauges disposed on the shaft 14 of the device 10 and operably connected to the microcontroller circuit 101/electronics unit 20.

According to yet another exemplary embodiment, the device 10 can be configured with three sensors 30 in the form of torsional strain gauges disposed on the shaft 14 of the device 10 and operably connected to the microcontroller circuit 101/electronics unit 20.

According to yet another exemplary embodiment, the device 10 can be configured with one or more sensors 30 in the form of torsional strain gauges disposed on the shaft 14 of the device 10 and a Hall sensor 120 also disposed on the shaft 14, each sensor 30,120 operably connected to the microcontroller circuit 101/electronics unit 20.

According to yet another exemplary embodiment, the device 10 can be configured with one or more sensors 30 in the form of torsional strain gauges disposed on the shaft 14 of the device 10 and a bending beam or bar 108 connected between the housing 18 and the shaft 14, the bar 108 having a strain gauge 114 thereon, each sensor 30/gauge 114 operably connected to the microcontroller circuit 101/electronics unit 20.

According to yet another exemplary embodiment, the device 10 can be configured with one or more sensors 30 in the form of torsional strain gauges disposed on the shaft 14 of the device 10 and a magneto-resistive angle sensor (magnet 132/reed switch 138 sensor), each operably connected to the microcontroller circuit 101/electronics unit 20.

According to yet another exemplary embodiment, the device 10 can be configured with one or more sensors 30 in the form of torsional strain gauges disposed on the shaft 14 of the device 10 and a magneto-resistive rotary sensor 140, each operably connected to the microcontroller circuit 101/electronics unit 20.

In another exemplary embodiment of the invention, in order to activate the self-check mode for the device 10, the device 10 can include an accelerometer 1000 disposed on the electronics unit 20. The accelerometer 1000 is capable of sensing movement above a certain specified threshold for the device 10, such that a firm shake of the device 10 can be sensed by the accelerometer 1000, while normal usage of the device 10 is not sufficient to be detected. In using the accelerometer 1000, the self-check function can be activated by firmly shaking the device 10 in order to enable the accelerometer 1000 to sense the movement and activates the self-check function. This activation mechanism prevents the need for separate buttons (not shown) or other activation mechanisms disposed on the exterior of the device 10 and/or housing 18, which can provide unwanted access points to the interior of the device 10. Further, the accelerometer 1000 can be configured to sense any movement of the device 10, such that the accelerometer 1000 activates the self-check function on any occasion where the device 10 is in use, thereby eliminating the need for the user to actively check the calibration of the device 10.

Various other embodiments of the invention are contemplated as being within the scope of the filed claims particularly pointing out and distinctly claiming the subject matter regarded as the invention.

The invention claimed is:

1. A driving toot comprising:
   a) a housing;
   b) a shaft operably connected to the housing and engageable with a fastener;
   c) an electronics unit within the housing, the electronics unit including a self-checking three measuring mechanism including a force measuring sensor operably connected to the shaft and operable to determine the force applied by the driving tool and provide a calibration check for the force measuring mechanism;
   d) an activation mechanism operably connected to the electronics unit comprising:
      i) an arm rotatably mounted to the shaft;
      ii) a magnet disposed within the arm and spaced form the shaft; and
      iii) a switch disposed in the housing and selectively alignable with the magnet,
   wherein the arm comprises:
      i) a collar disposed opposite the magnet and disposed around the shaft; and
      ii) a stop disposed on an interior surface of the collar and engageable with a tab disposed on the shaft.

2. The driving tool of claim 1 wherein the three measuring mechanism comprises at least two sensors disposed on the shaft and operably connected to the electronics unit.

3. The driving tool of claim 2 wherein the force measuring mechanism comprises at least three sensors disposed on the shaft and operably connected to the electronics unit.

4. The driving tool of claim 2 wherein the at least two sensors are strain gauges.

5. The driving tool of claim 2 wherein one of the at least two sensors is a Hall sensor.

6. The driving tool of claim 2 wherein one of the at least two sensors is a reed switch.

7. The driving tool of claim 2 wherein one of the at least two sensors is a magneto-resistive angle sensor.

8. The driving tool of claim 2 wherein one of the at least two sensors is a magneto-resistive torque sensor.

9. The driving tool of claim 2 wherein one of the at least two sensors is a bending bar strain gauge.

10. The driving tool of claim 2 wherein the at least two are torsional strain gauges.

11. The driving tool of claim 1 further comprising a display on the housing that is operably connected to the electronics unit.

12. The driving tool of claim 11 wherein the display comprises at least one LED.

13. A method of checking the accuracy of a force measuring mechanism on a driving tool comprising the steps of:
    a) providing the tool of claim 1;
    b) engaging a fastener with the tool;
    c) operating the tool to engage the fastener within a substrate; and
    d) comparing an output value from the force measuring sensor with a reference value.

14. The method of claim 13 wherein the step of comparing an output value from the force measuring sensor with a reference value comprises comparing the output value with a reference value stored within an electronic storage medium on the electronics unit.

15. The method of claim 13 wherein the step of comparing an output value from the force measuring sensor with a reference value comprises comparing the output value of a first sensor with an output value of a second sensor.

* * * * *

UNITED STATES PATENT AND TRADEMARK OFFICE
CERTIFICATE OF CORRECTION

PATENT NO. : 10,987,785 B2  
APPLICATION NO. : 15/677215  
DATED : April 27, 2021  
INVENTOR(S) : Michael T. Gauthier et al.

Page 1 of 1

It is certified that error appears in the above-identified patent and that said Letters Patent is hereby corrected as shown below:

In the Claims

Claim 1, Column 11, Line 26, delete "three" and substitute therefore -- force --;

Claim 1, Column 11, Line 35, delete "form" and substitute therefore -- from --;

Claim 2, Column 12, Line 1, delete "three" and substitute therefore -- force --;

Claim 10, Column 12, Line 19, after "two" insert -- sensors --.

Signed and Sealed this  
Eighth Day of June, 2021

Drew Hirshfeld  
*Performing the Functions and Duties of the*  
*Under Secretary of Commerce for Intellectual Property and*  
*Director of the United States Patent and Trademark Office*